United States Patent [19]

Tominaga et al.

[11] Patent Number: 5,169,235
[45] Date of Patent: Dec. 8, 1992

[54] RADIATION TYPE THERMOMETER

[75] Inventors: Hitoshi Tominaga; Masami Tanaka; Masayoshi Koshino; Hideo Ishibashi, all of Tokyo, Japan

[73] Assignee: Hirose Electric Co., Ltd., Tokyo, Japan

[21] Appl. No.: 753,403

[22] Filed: Aug. 30, 1991

[30] Foreign Application Priority Data

Aug. 30, 1990 [JP] Japan .................................. 2-228861

[51] Int. Cl.⁵ .......................... G01J 5/10; A61B 6/00
[52] U.S. Cl. ................................. 374/129; 374/121; 374/126; 128/664; 128/736
[58] Field of Search ............... 374/121, 126, 129, 128, 374/130, 132, 133; 250/338.1; 128/664, 736

[56] References Cited

U.S. PATENT DOCUMENTS

| | | | |
|---|---|---|---|
| 4,005,605 | 2/1977 | Michael | 374/129 |
| 4,602,642 | 7/1986 | O'Hara et al. | 128/736 X |
| 4,634,294 | 1/1987 | Christol et al. | 374/130 X |
| 4,797,840 | 1/1989 | Fraden | 374/133 X |
| 4,932,789 | 6/1990 | Egawa et al. | 374/129 X |
| 4,993,419 | 2/1991 | Pompei et al. | 128/664 |
| 5,012,813 | 5/1991 | Pompei et al. | 128/664 |
| 5,024,533 | 6/1991 | Egawa et al. | 374/129 X |

Primary Examiner—William A. Cuchlinski, Jr.
Assistant Examiner—G. Bradley Bennett
Attorney, Agent, or Firm—Kanesaka & Takeuchi

[57] ABSTRACT

A thermometer includes an infrared sensor (14) for receiving infrared radiation to generate a corresponding electrical signal; a reference unit (10) for emitting a standard infrared radiation; a temperature sensor (11) for receiving the standard infrared radiation to generate a corresponding standard electrical signal; a support unit (1, 2) for supporting the infrared sensor and the reference means such that the infrared sensor receives the standard infrared radiation from the reference means in a standby state and infrared radiation from a subject in a measurement state; an arithmetic unit (44) for computing a temperature of the subject based on the electrical signals from the infrared sensor in both the standby and measurement states and from the temperature sensor.

5 Claims, 7 Drawing Sheets

RADIATION TYPE THERMOMETER

BACKGROUND OF THE INVENTION

1. Field of the Invention

The present invention is related generally to thermometers and, more particularly, to a thermometer of the radiation type which measures temperatures by detecting infrared radiation emitted by a subject, such as the eardrum.

2. Description of the Prior Art

Japanese Patent Application Kokai Nos. 61-117422 ('422) and 2-28524 ('524) have proposed thermometers of this type for use in measuring the temperature of patients in hospitals because the time for taking the temperature is reduced very much. The thermometers have a metallic tube attached to the front of an infrared sensor, such as a thermopile, and an adiabatic material for surrounding the entire metal tube to form a probe. This probe is inserted into the external auditory canal to sense the infrared radiation from the eardrum for taking the temperature. In order to assure the accuracy of clinical thermometers, the '422 has proposed to preliminarily heat the measuring system to a constant temperature (36.5 degrees C.) to eliminate various errors. The '524 has proposed to assure the accuracy by means of various correction devices.

However, the above thermometers have the following disadvantages:

The '422 device requires:

(1) a time for preliminary heating;

(2) a high-precision heat control unit which makes the circuit complicated and the unit manufacturing cost high; and (3) a high power supply for driving the heat control unit, resulting in the bulky device.

The '524 device does not employ any heat control unit and is free of the above disadvantages, but, where there is thermal unbalance in the system, it employs a temperature sensor attached to the front tube of the infrared sensor to compute the temperature using the measurement for correction. However, it still has the following disadvantages:

(1) The thermal unbalance indicates the presence of thermal gradient in the metal tube. Consequently, taking a measurement at a point as the representative temperature of the metal tube brings about a new error.

(2) To avoid such an error, a separate sensor is provided near the infrared sensor to compute a difference in temperature between them while a critical temperature is set to issue a measurement permit. However, their circuitry is so complicated as to push up the unit manufacturing cost and limit the measuring range.

SUMMARY OF THE INVENTION

Accordingly, it is an object of the invention to provide a compact, low cost thermometer of the radiation type.

It is another object of the invention to provide a radiation type thermometer for permitting repeated measurements for a short time period with high accuracy.

According to the invention there is provided a thermometer which includes an infrared sensor for receiving infrared radiation to generate a corresponding electrical signal; a reference unit for emitting a standard infrared radiation; a temperature sensor for receiving the standard infrared radiation to generate a corresponding standard electrical signal; a support unit for supporting the infrared sensor and the reference means such that the infrared sensor receives the standard infrared radiation from the reference means in a standby state and infrared radiation from a subject in a measurement state; an arithmetic unit for computing a temperature of the subject based on the electrical signals from the infrared sensor in both the standby and measurement states and from the temperature sensor.

According to the invention, no heating device is required, thus reducing the unit manufacturing cost and the volume of the unit. Even if the thermal balance of the measuring system is disturbed, it is possible to make measurement, thus making repeated measurements possible in a short time period with accuracy. In addition, it is not necessary to return the probe unit to the base unit for each measurement.

The above and other objects, features, and advantages of the invention will be more apparent from the following description when taken in conjunction with the accompanying drawings.

DESCRIPTION OF THE PREFERRED EMBODIMENT

Figure 1:
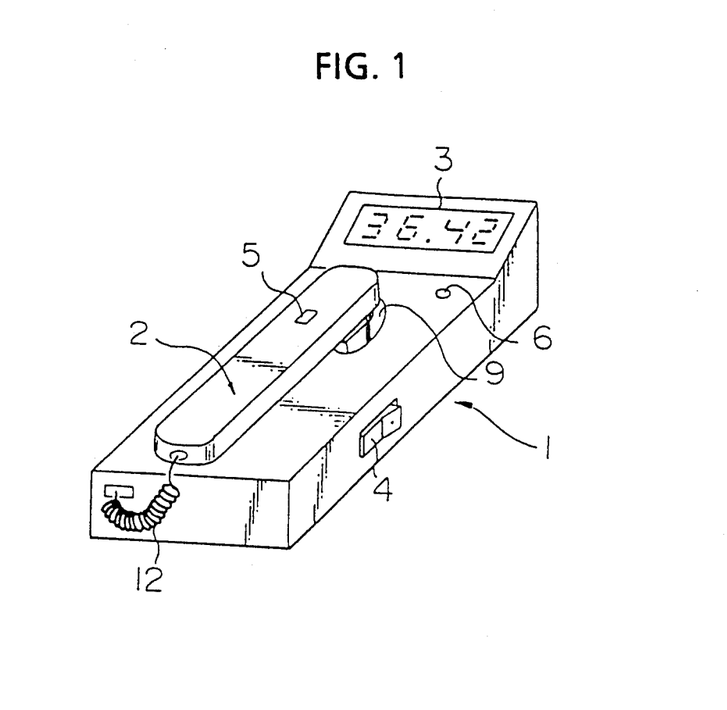
FIG. 1 is a perspective view of a thermometer according to an embodiment of the invention.
Figure 2:
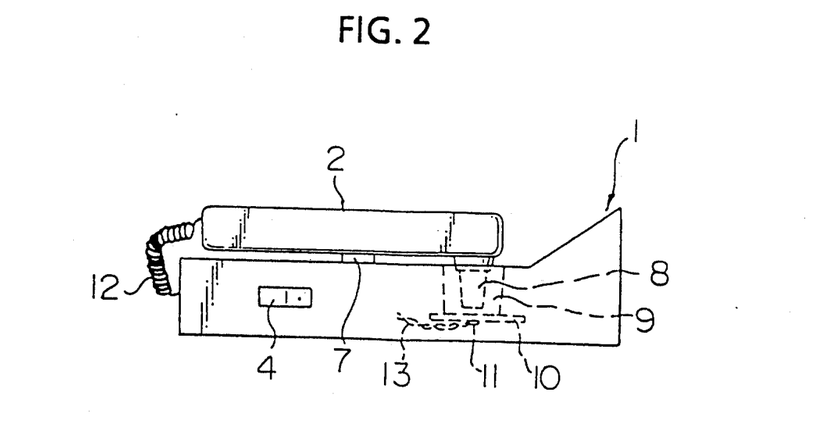
FIG. 2 is a side elevational view of the thermometer.

In FIGS. 1 and 2, a thermometer consists of a base unit 1 and a probe unit 2 mounted on the base unit 1. The base unit 1 includes a circuit board (not shown) for performing arithmetic operations; a power switch 4 on a side for energizing the circuit; a reference switch 7 under the probe unit 2; an liquid crystal display 3 on the sloped top section for displaying the measurement results; and a measurement permit light emitting diode display 6 on the flat top section. Also, it has a hole 9 and a reference plate 10 on the bottom of the hole 9. A temperature sensor 11 is attached to the reference plate 10, the output of which is fed to the circuit board via lead wires 13. The reference plate 10 should be made from a material which has high radiation rate and thermal conductivity such as a metal coated with a lusterless black paint. The temperature sensor 11 may be any of those that is able to detect the temperature of the reference plate 10 such as a temperature sensing diode.

The probe unit 2 includes a start switch 5 indicative of the start of an arithmetic operation and a probe 8 at the front end. As best shown in FIG. 2, the probe unit 2 is set on the base unit 1 such that the probe 8 is placed in the hole 9. When the probe unit 2 is set on the base unit 1, it depresses the reference switch 7 to permit measurement of the reference plate 10.

Figure 3:
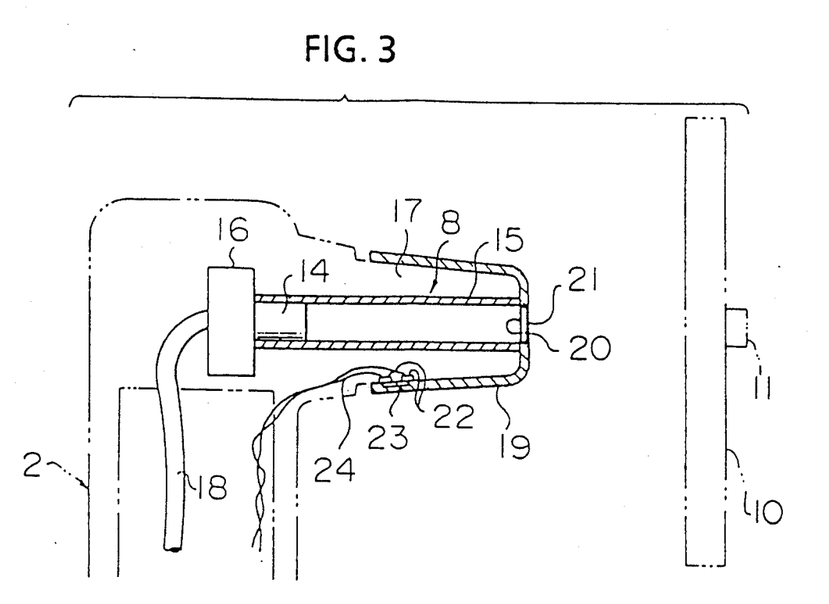
FIG. 3 is an enlarged sectional view of a probe portion of the thermometer.

In FIG. 3, the probe 8 includes a mount 16; an infrared sensor 14 such as a thermopile; and a waveguide 15 composed of a metal tube. The infrared sensor 14 and the metal tube 15 are covered with a adiabatic material 17. The output of the infrared sensor 14 is fed to the circuit board via a cord 18 and a cord 12 which connects the probe unit 2 to the base unit 1. If necessary, a cover 19 made from a material having low thermal conductivity may be used at the front end of the probe 8 to prevent the probe from direct contact with the earhole. A metal piece 23 is embedded in the cover 19, with the top face exposed. A pair of metal pads 22 are embedded in the adiabatic material 17, with the bottom face exposed. A pair of conductors 24 connected to the circuit board via the cord 12 are attached to the metal pads 22.

When the cover 19 is mounted on the front end of the probe 8 as shown in FIG. 3, the two metal pads 22 are electrically connected via the metal piece 23, connecting the two conductors 24 so that the circuit board learns of the mount of the cover 19. A pair of transparent filters 20 and 21 are attached to the front ends of the metal tube 15 and the cover 19, respectively. Both of the filters 20 and 21 are made from a material that is able to transmit infrared radiation. When the probe 8 is set in the hole 9 of the base unit 1, the reference plate 10 is opposed to the infrared sensor 4 as shown in FIG. 3.

In use, the power switch 4 is turned on, with the probe unit 2 set on the base unit 1 (hereinafter called "set condition") as shown in FIG. 1, so that the measurement permit LED 6 lights up. Then, the probe unit 2 is picked up, and the probe 8 is inserted into the earhole. The start switch 5 is turned on to start arithmetic operations in the circuit board, with the result that the temperature is displayed in the LCD 3.

Figures 4, 5:
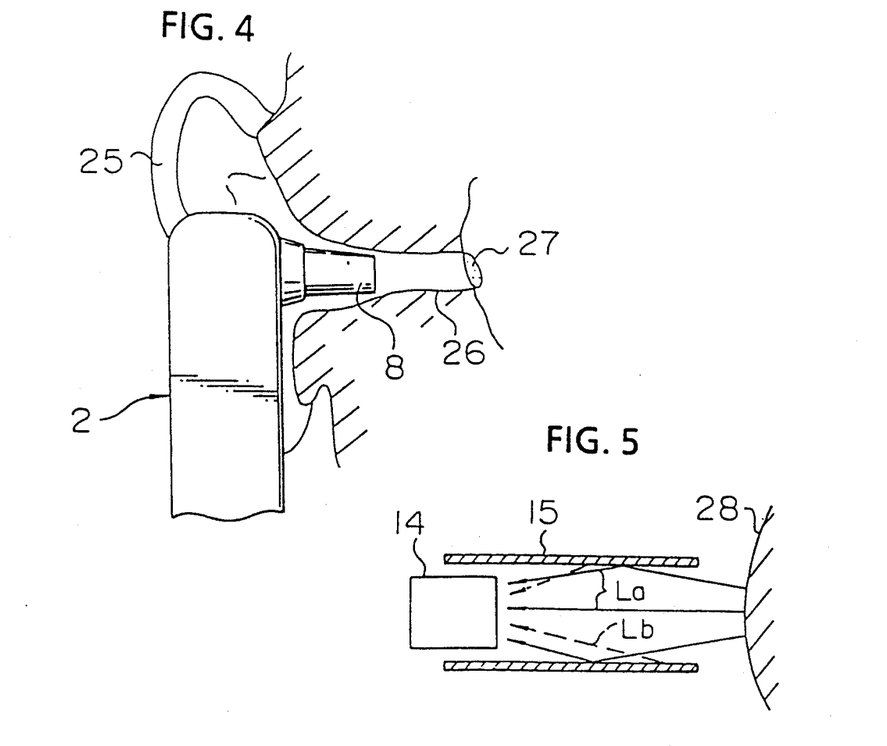
FIG. 4 is a side elevational view of the probe portion wherein the probe is inserted into the earhole.
FIG. 5 is a schematic diagram showing how the thermometer works.

FIG. 4 shows an anatomy of the ear which consists of an auricle 25, the external auditory canal 26, and the eardrum 27. The probe 8 is inserted into the external auditory canal 26 of the earhole. To take another measurement, return the probe unit 2 to the base unit 1 to turn on the measurement permit LED 6. Then, the above procedure is repeated.

The operational principle will be described below. From Stefan-Boltmann law "all objects give off the energy that is proportional to the fourth power of the absolute temperature," the output of the infrared sensor 14 which is in the earhole 26 is given by $$P = Ko(aTk^4 + bTb^4 - To^4) \quad (1)$$

wherein
P is the output of the infrared sensor 14;
Tk is the temperature of the eardrum;
Tb is the temperature of the metal tube 15;
To is the temperature of the infrared sensor 14;
Ko is a constant independent of the physical factors of respective parts of the system; and
a and b are proportional constants depending on the physical factors of respective parts of the system.

In FIG. 5, the infrared radiation La emitted from an object 28, such as the eardrum 27, reaches the infrared sensor 14 either directly or by reflection at the inside of the metal tube 15. This is represented by the term $(aTk^4)$ of the formula (1). The infrared radiation Lb is emitted from the metal tube 15 and reaches the infrared sensor 14. This is represented by the term $(bTb^4)$. The term $(To^4)$ represents that of the temperature of the infrared sensor 14. The difference between $(aTk^4 + bTb^4)$ and $(To^4)$ is proportional to the output of the infrared sensor 14.

To determine the temperature Tk of the eardrum from the formula (1), it is necessary to find the temperature Tb of the metal tube 15 and the temperature To of the infrared sensor 14. Where the metal tube 15 and the infrared sensor 14 are in the steady state, or the temperature does not change, it is easy to find Tb and To by attaching temperature sensing elements such as temperature sensing diodes. However, where the steady state is disturbed by the temperature of a subject, etc. in repeated measurements, the temperature of the metal tube 15 changes from point to point, making it very difficult to find the terms $(bTb^4)$ and $(To^4)$. In practice, a certain time period, such as 10 minutes is taken, to permit recovery of the steady state.

According to the invention, the preliminary measurement is made under the set condition (FIG. 1). The output of the infrared sensor 14 is given by $$P' = Ko(a'Tr^4 + bTb'^4 - To'^4) \quad (2)$$

wherein
P' is the output of the infrared sensor 14;
Tr is the temperature of the reference plate 10;
Tb' is the temperature of the metal tube 15;
To' is the temperature of the infrared sensor 14;
Ko is a constant independent of the physical factors of respective parts of the system; and
a' and b are proportional constants dependent on the physical factors of respective parts of the system.

The formula (2) is similar to the formula (1). As soon as the preliminary measurement is taken, the probe unit 2 is picked up, and the temperature of the eardrum is taken as shown in FIG. 4. The output P of the infrared sensor 14 is given by the formula (1) wherein the temperatures of the metal tube 15 and the infrared sensor 14 in the initial period are Tb=Tb' and To=To'. In the initial period of measurement, subtracting the formula (1) from the formula (2) gives $$P' - P = Ko(a'Tr^4 - aTk^4) \quad (3)$$

The equation (3), from which the effects of the metal tube 15 and the infrared sensor 14 are removed, are independent of their conditions. Further, it is rearranged as $$Tk = \left( \frac{P - P'}{aKo} + \frac{a'}{a} Tr^4 \right)^{\frac{1}{4}} \quad (4)$$

Since the temperature Tr of the reference plate 10 is detected by the diode 11, Tk is determined from the equation (4) by determining Ko, a, and a' by experiments.

As has been described above, even if the metal tube 15 and the infrared sensor 14 are not in the steady state, their effects are offset so that it is possible to measure the temperature of the eardrum. Thus, it is possible to make repeated measurements without providing any time for recovering the steady state.

Figure 6:
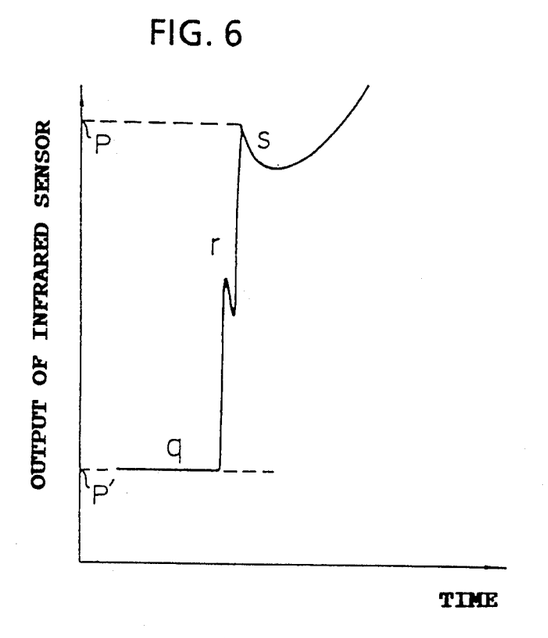
FIGS. 6 and 7 are graphs showing changes of the infrared sensor output.
Figure 7:
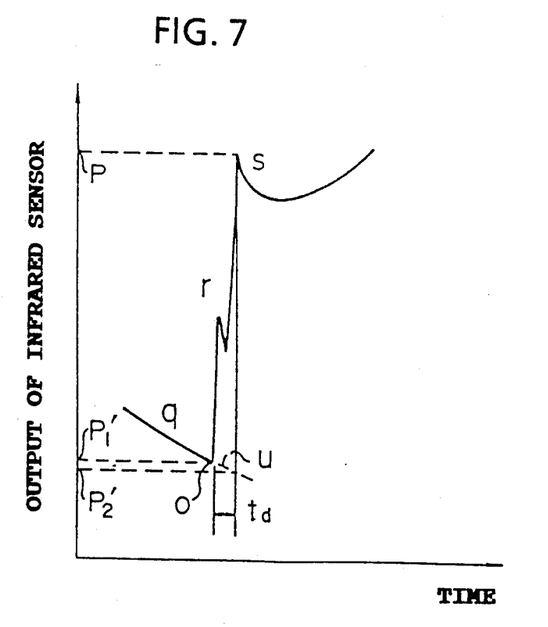

Changes in the output of the infrared sensor 14 are shown in FIG. 6, wherein the metal tube 15 and the infrared sensor 14 were in the steady state at the time of measuring the reference plate 10, and in FIG. 7, wherein they were not in the steady state. A line segment q represents the output during the measurement of the reference plate 10. A line segment r represents changes in the output between the removal of the probe unit 2 from the base unit 1 and the insertion of the probe 8 in the earhole. A line segment s represents changes in the output after the probe 8 is inserted in the earhole. The output temporarily falls as soon as the probe 8 is inserted in the earhole because the probe 8 cools the earhole. The time constant of the infrared sensor is normally a few milliseconds while the time constant of the earhole and the metal tube is believed to be hundreds milliseconds. Accordingly, the peak output value P of the infrared sensor 14 when the probe 8 is inserted into the earhole is considered to be a measurement of the eardrum. The temporarily dropped output rises again as the temperature of the earhole recovers, and the temperature of the metal tube 15 rises.

It is appreciated that the output of the infrared sensor is constant in the line segment q of FIG. 6 but changes in FIG. 7 because the terms $(bTb'^4)$ and $(To'^4)$ of the formula (2) vary with the time due to the unstable conditions of the metal tube 15 and the infrared sensor 14. In FIG. 6, the constant value of the line segment q indicates that the output P' of the infrared sensor 14 is constant during the measurement of the reference plate 10. In FIG. 7, the estimated value P2' at the peak value P should be taken as the output P' because it is more accurate than the value P1'. It is impossible to measure the reference plate 10 and the eardrum at the same time, but it takes Td (1 or 2 seconds) between the measurement of the reference plate 10 and that of the eardrum. The extension line u of the line segment q for determining the estimated value P2' is approximated by a tangent to the line segment q at the intersection o of the line segments q and r.

Figure 8:
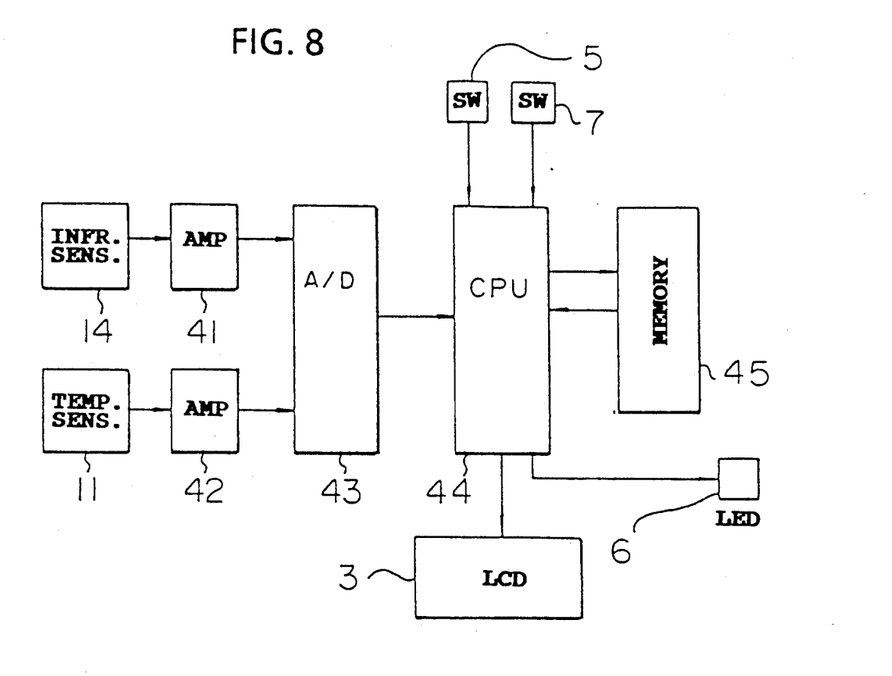
FIG. 8 is a block diagram of a circuit of the thermometer.

In FIG. 8, the circuit in the base unit 1 includes an amplifier 41 for amplifying the output of the infrared sensor 14; an amplifier 42 for amplifying the output of the temperature sensor 11; an analog/digital converter 43 for converting the amplified signals from the amplifiers 41 and 42; a memory 45 for storing data; and a central processing unit 44 which is operated by instructions from the start switch 5 and the reference switch 7 to receive the digital signals from the A/D converter 43 and store them in the memory 45 and read data from the memory 45 for performing arithmetic operations to display a measurement permit in the LED 6 and the measurement results in the LCD 3.

Figure 9:
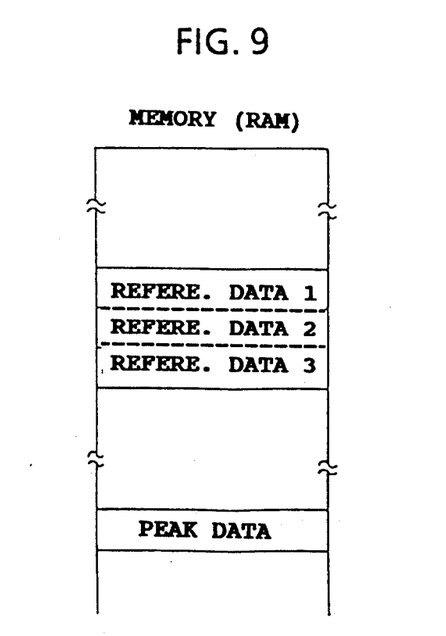
FIG. 9 is a diagram showing the contents of the memory of FIG. 8.

FIG. 9 shows the contents of the memory 44.

Figure 10:
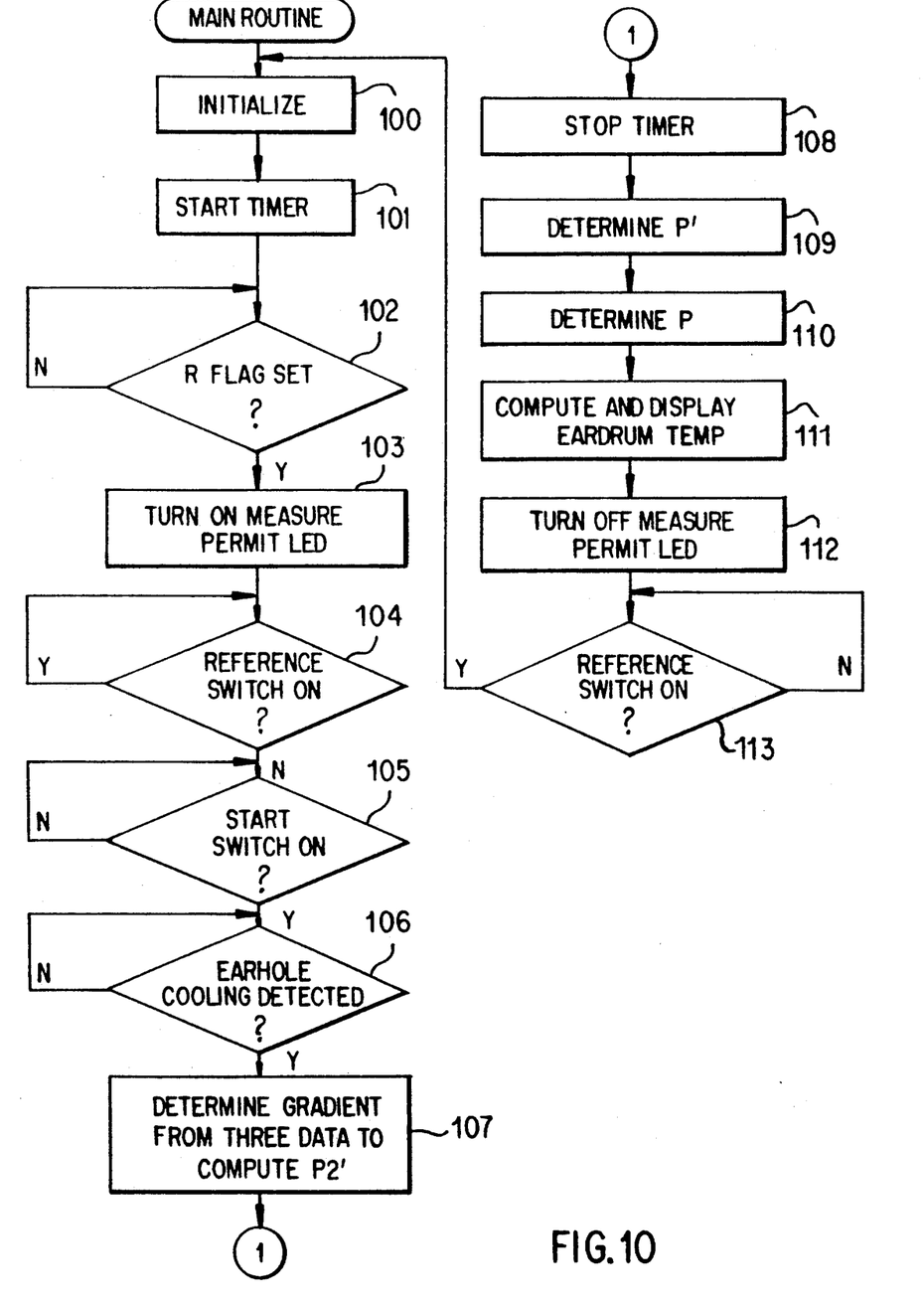
FIG. 10 is a flowchart showing the main routine.
Figure 11:
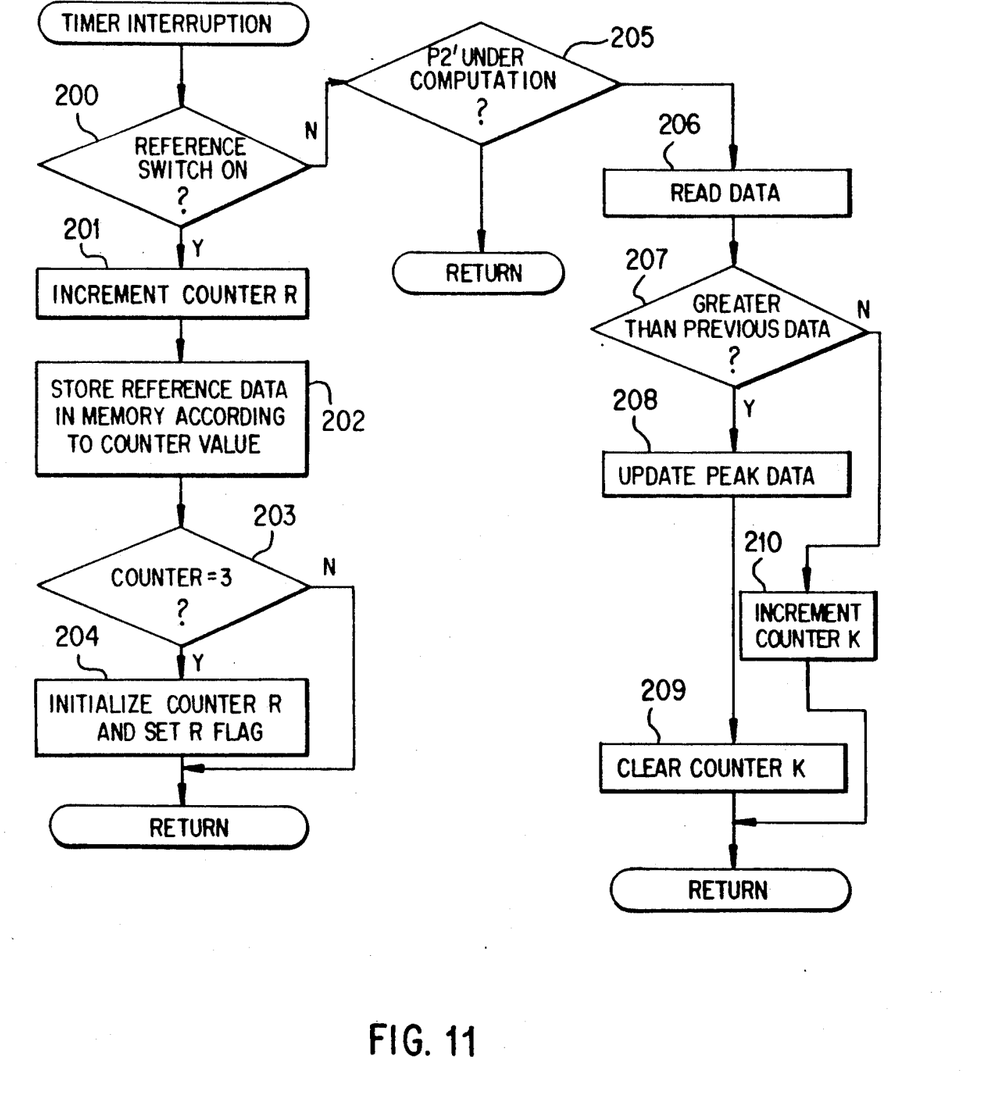
FIG. 11 is a flowchart showing the timer interruption routine.

As FIG. 10 shows, in Step 100 of the main routine, the power switch 4 is turned on for initialization. In Step 101, the timer for interruption is turned on to apply interruption at regular intervals as shown in FIG. 11. To determine P', reference data are stored in the memory 44. In Step 200, whether the reference switch 7 is turned on is checked. If yes, in Step 201, the counter R is incremented. In Step 202, the reference data are stored in the memory until the value of the counter R reaches 3. Consequently, three reference data are stored in the memory 44 as shown in FIG. 9. When it is determined that the value of the counter R is 3 in Step 203, the counter R is initialized, and an R flag is set in Step 204. In this way, the three reference data in the memory are always updated by the timer interruption routine. When the R flag is found in Step 102 of the main routine, the measurement permit LED 6 is turned on in Step 103. Whether the reference switch 7 is on is checked in Step 104.

When P2' is not under computation in Step 205 of the timer interruption routine, in step 206 the eardrum measurement is stored in the memory for each interruption. Since it is necessary to determine the peak value P, in step 207 the data of the present interruption is compared with that of the previous one. If the present data is greater than the previous one, in step 208 the peak value in the memory of FIG. 9 is updated with the present data. In Step 105, whether the start switch 5 is on is checked to assure that the peak data is the true peak value P. In Step 106, whether cooling of the earhole is detected is checked. This is done by determining whether it occurs that the previous data is greater than the present data for a predetermined times K in the timer interruption routine in Steps 209 and 210 of FIG. 11. After the cooling of the earhole is detected in Step 106, the gradient is determined from the three reference data (1), (2), and (3) in the memory, thereby computing P2' in Step 107. The timer is stopped in Step 108.

In this way, P' and P are determined in Steps 109 and 110, respectively. From the thus obtained values P and P' the eardrum temperature Tk is determined using the equation (4) and displayed in the LCD 3 in Step 111. The measurement permit LED is turned off in Step 112, and whether the reference switch is on is checked in Step 113. This completes the temperature measurement operation.

Figure 12:
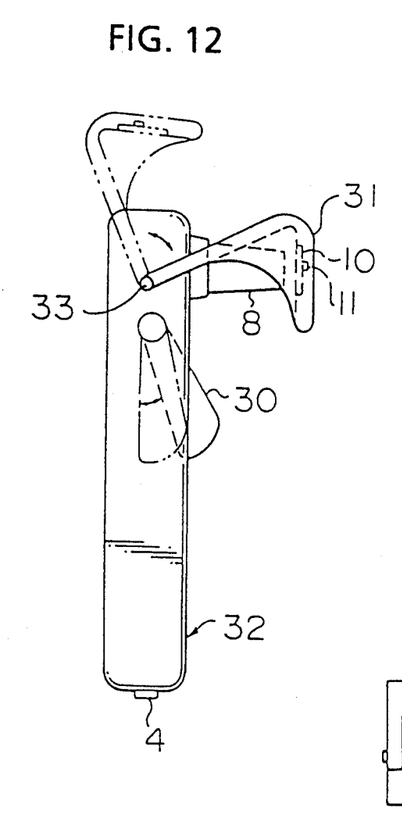
FIG. 12 is a side view of a thermometer according to another embodiment of the invention.
Figure 13:
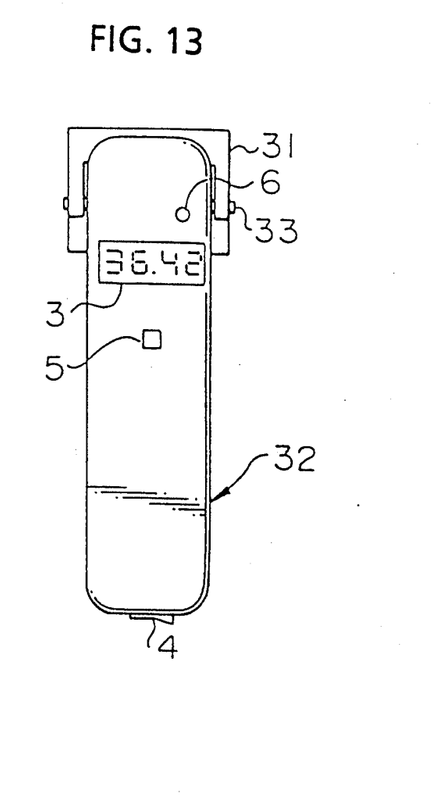
FIG. 13 is a rear view of the thermometer.

In FIGS. 12 and 13, a thermometer includes a probe unit 32 which is provided with a probe 8 at the upper front. The probe unit 32 includes a reference plate 10 and a reference mask 31 which is provided with a diode 11 for detecting the temperature of the reference plate 10. The reference mask 31 is turned about a shaft 33 by moving a lever 30 so that the reference plate 10 is moved between the closed position where it is opposed to the probe 8 as shown by a solid line in FIG. 12 and the open position where it is away from the probe 8 as shown by a broken line. When the lever 30 is released, the reference mask 31 is returned to the closed position. A power switch 4 and a start switch 5 are provided at the bottom and the back of the probe unit 32, respectively. An LCD 3 and a measurement permit LED 6 are provided on the back, too. The operational principle of this thermometer is the same as that of the thermometer described above. The arithmetic operation unit on the circuit board mounted in the base unit 1 in the above embodiment is mounted in the probe unit 32 in this embodiment.

When the power switch 4 is turned on, and the measurement permit LED 6 is turned on, the lever 30 is squeezed, and the probe 8 is inserted into the earhole. When the start switch 5 is turned on, the eardrum temperature is displayed on the LCD 3. To take another measurement, the lever 30 is released to return the reference mask 31 to the closed position. When the measurement permit LED 6 lights up, measurement is made in the same way as above.

We claim:
1. A thermometer comprising:
an infrared sensor for receiving infrared radiation to generate a corresponding electrical signal;
reference means for emitting a standard infrared radiation;

a temperature sensor attached to said reference means to generate a standard electrical signal indicative of a temperature of said reference means;

support means for supporting said infrared sensor and said reference means such that said infrared sensor receives said standard infrared radiation from said reference means in a standby state and infrared radiation from a subject in a measurement state; and arithmetic means for computing a temperature of said subject based on said electrical signals from said infrared sensor in both said standby and measurement states and from said temperature sensor.

2. The thermometer of claim 1, wherein said support means comprises a base unit and a probe unit to be mounted on said base unit and said infrared sensor and said reference means are mounted on said probe unit and said base unit, respectively, such that when said probe unit is mounted on said base unit, said infrared sensor is opposed to said reference means.

3. The thermometer of claim 1, wherein said support means comprises a probe unit and a reference mask, and said infrared sensor and said reference means are mounted on said probe unit and said reference mask, respectively, said reference mask being attached to said probe unit so as to move between a closed position where said reference means is opposed to said infrared sensor and an open position where said reference means is away from said infrared sensor.

4. A radiation-type thermometer comprising:
a probe for collecting infrared radiation;
an infrared sensor disposed at an end of said probe for receiving said infrared radiation to generate a corresponding electrical signals;
reference means for emitting a standard infrared radiation;
a temperature sensor attached to said reference means to generate a standard electrical signal indicative of a temperature of said reference means;
support means, for supporting said probe and reference means such that said infrared sensor receive said standard radiation from said reference means in a standby state and infrared radiation from a subject in a measurement state;
an A/D converter for converting said corresponding and standard electrical signals into corresponding and standard digital data, respectively;
a memory for storing said digital data; and
arithmetic means for eliminating influences under temperatures of said probe based on said digital signals.

5. The radiation-type thermometer of claim 4, wherein said arithmetic means stores in said memory digital data of infrared radiation from said reference means in a stand-by state and digital data of infrared radiation from said subject and eliminates influences under temperatures of said probe to determine a temperature of said subject from the following formula:

$$T_k = \left( \frac{P - P'}{aK_0} + \frac{a'}{a} T r^4 \right)^{\frac{1}{4}}$$

wherein
P is the digital data about said subject;
P' is the digital data about said reference;
Tk is the temperature of said subject;
Tr is the temperature of said reference means;
Ko is a constant independent of said thermometer;
a is a constant for said measurement state;
a' is a constant for said stand-by state.

* * * * *